INVENTOR.
RUSSELL W. TACCONE
BY
Charles L Lovenbach
atty

Sept. 20, 1966  R. W. TACCONE  3,273,207
MACHINE FOR HANDLING PATTERNS
Filed March 26, 1964  5 Sheets-Sheet 2
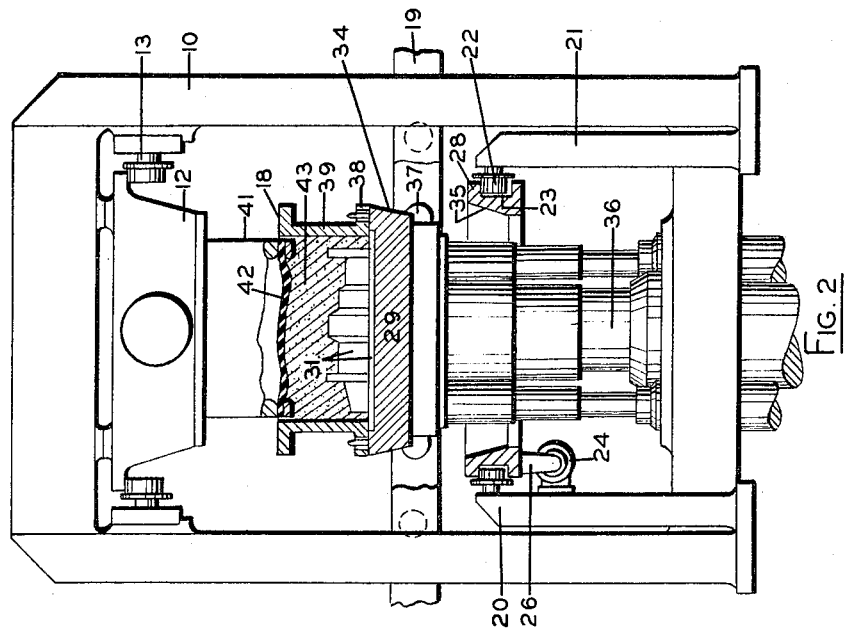
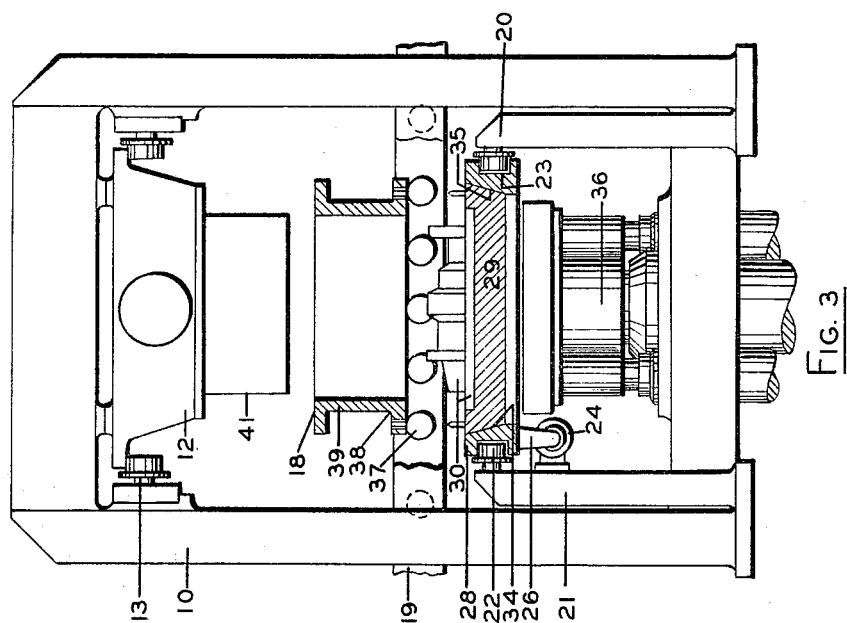
INVENTOR.
RUSSELL W. TACCONE
BY
Charles L. Lauriault Sept. 20, 1966 R. W. TACCONE 3,273,207
MACHINE FOR HANDLING PATTERNS
Filed March 26, 1964 5 Sheets-Sheet 3

INVENTOR.
RUSSELL W. TACCONE

BY Charles L Lovenbuck
atty

Sept. 20, 1966 R. W. TACCONE 3,273,207
MACHINE FOR HANDLING PATTERNS
Filed March 26, 1964 5 Sheets-Sheet 4

INVENTOR
RUSSELL W. TACCONE
BY
Charles L. Lauerdick
ATTY.

Sept. 20, 1966  R. W. TACCONE  3,273,207
MACHINE FOR HANDLING PATTERNS
Filed March 26, 1964  5 Sheets-Sheet 5

INVENTOR.
RUSSELL W. TACCONE
BY Charles T. Lonsdale
atty

United States Patent Office 3,273,207
Patented Sept. 20, 1966

3,273,207
MACHINE FOR HANDLING PATTERNS
Russell W. Taccone, Erie, Pa., assignor to Taccone Corporation, North East, Pa., a corporation of Pennsylvania
Filed Mar. 26, 1964, Ser. No. 354,916
16 Claims. (Cl. 22—20)

This application relates to molding machines and more particularly to machines for making green sand molds in a foundry. In the manufacture of green sand molds for making castings especially in foundries where a small number of castings of one kind are made at one time, it is desirable to be able to rapidly change patterns in the molding machines.

The machine disclosed herein makes it possible to rapidly change the patterns in a molding machine and to perform the operation of introducing one or more patterns into a molding machine. The machine makes it possible to introduce the patterns in such a manner that no interruption whatever of the molding machine is experienced during the molding cycle.

The machine disclosed herein offers the advantage of being able to introduce completely new patterns into the molding system without interruption to that system. With a pattern located external to the molding machine as well as one within the molding unit, the molding unit may continue to cycle as the external pattern is removed and a new pattern set in its place. When the pattern within the machine has completed the forming of the mold half this pattern (which is mated to the heretofore removed pattern) is cycled from the machine and the now mounted new pattern is cycled into the machine to begin the fabrication of a new type of mold. The external pattern is in turn now removed and the mating pattern to the pattern within the machine is mounted in its place to be alternately introduced into the molding cycle if the operation so chooses.

The machine also lends itself to the use of a particular type of pattern which employs a common carrier frame to support two or more pattern insertion sections of defined sizes. When a pattern is located external of the machine, the molding unit operator is able to easily remove a section of the pattern and replace it with a new section of the same dimensions or with two or more sections whose dimensions combined would be equal to the section removed.

The machine is suitable to perform the process of introducing several patterns in series such as having four patterns in a single level being introduced into the machine in order of relative position to each other.

The machine disclosed is adaptable to short run jobs of the kind that will be found in jobbing foundries. The flexibility of this unit adapts itself well to the foundry where very few of a particular casting would be desired (short runs). Because the patterns are easily interchangeable, removable and accessible, the unit operator is in sole control over the number of molding sequences performed on each pattern.

The machine disclosed will extend the utility of a molding machine to wider application, since a carrier frame in this unit transports the patterns into and from the molding station within the molding unit. It is now possible with a minimum amount of machinery to prepare patterns, heretofore incapable of being used on the molding unit, to fit within the carrier frame as an insert, thus providing a use for pattern equipment which up to this time has by necessity remained idle.

A pattern shuttle unit permits a foundry to operate extensively making both cope and drag molds utilizing a single station molding machine. A costly molding machine having two molding stations, one cope and one drag, can be replaced by a single station machine which incorporates a pattern shuttle allowing alternate molding of cope and drag molds.

It is an object of the invention to provide a molding machine having the features recited above.

It is another object of the invention to provide a molding machine which is simple in construction, economical to manufacture, and simple and efficient to use.

Another object of the invention is to provide a molding machine for making molds wherein the patterns can be changed rapidly without interrupting the cycle of the machine.

Another object of the invention is to provide an improved molding machine.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 2 is a cross-sectional view taken on line 2—2 of FIG. 4, showing the mold and pattern lifted into engagement with the ram.

FIG. 3 is a view similar to FIG. 2, showing the flask in place over the pattern plate before the flask and pattern have been moved into engagement with the ram.

Figure 6:
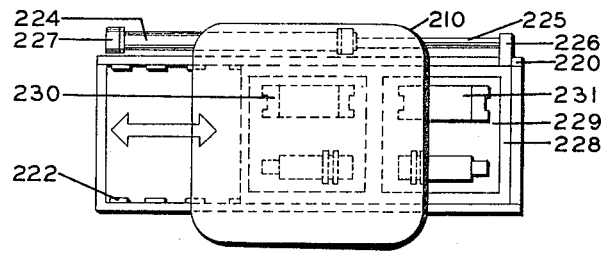
FIG. 6 is a view of another embodiment of the invention.
Figure 5:
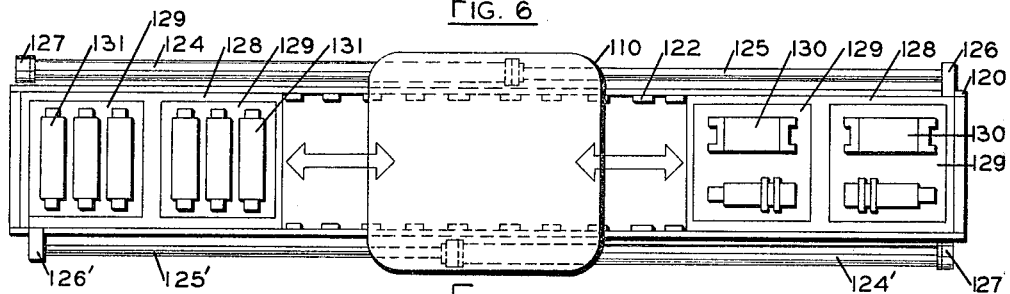
FIG. 5 is a view similar to FIG. 4 of another embodiment of the invention.
Figure 4:
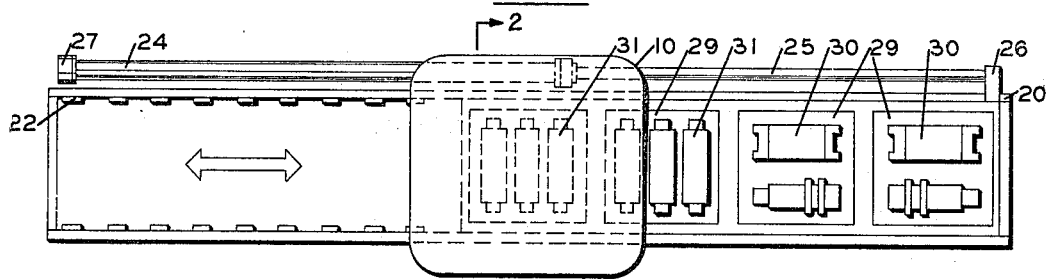
FIG. 4 is a top schematic view of a part of the machine shown in FIG. 1.
Figure 12:
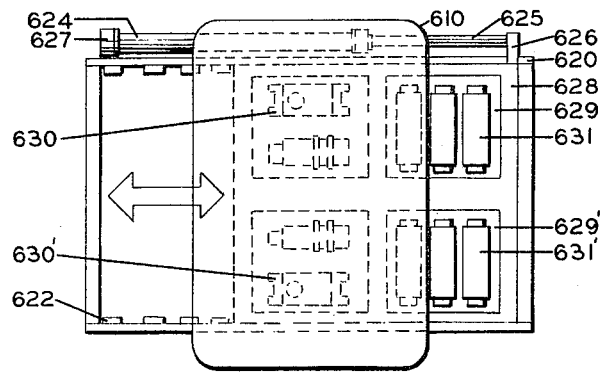
Figure 11:
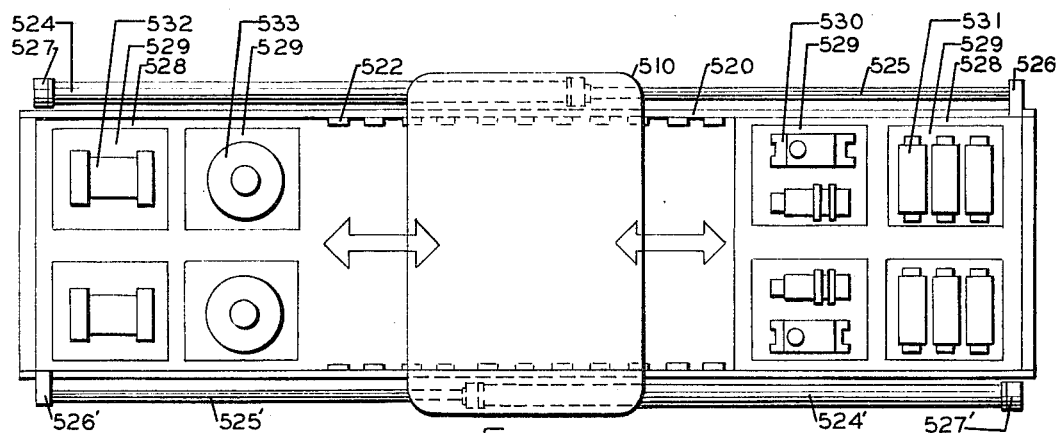
Figure 10:
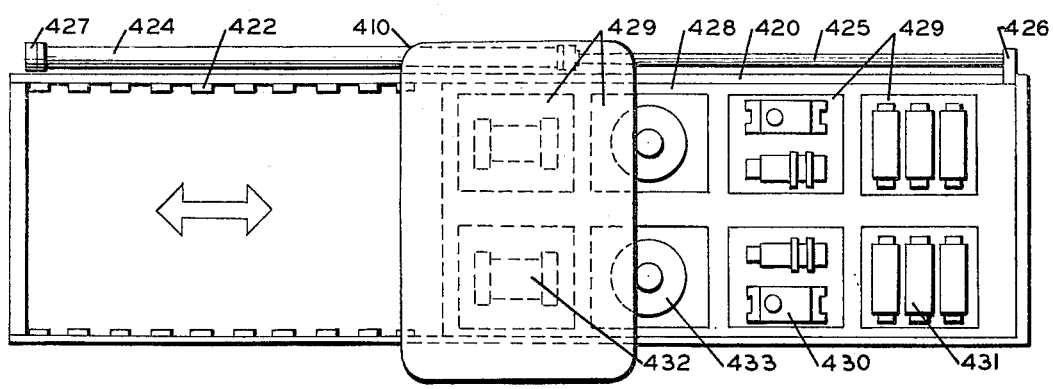

FIGS. 10, 11, and 12 are views similar to FIGS. 4, 5, and 6, showing a duplex machine constituting another embodiment of the invention.

Now with more particular reference to the drawing, and with particular reference to the embodiment of the invention shown in FIGS. 1, 2, 3, and 4, the molding machine shown has a frame tap which supports a sand loader 11 and a molding head 12 that is movable from under and out of the sand loader similar to the molding head shown in Patent No. 2,698,976. The molding head may be moved from a position under the sand loader to a position at the rear thereof by means of the conveyors 13 which are fixed to the frame 10 at each side thereof and has the spaced conveyors 13 which have spaced wheels which engage the outwardly extending flanges shown on the head 12. An upset which may be of the type shown in Patent No. 3,123,873 is supported on the hydraulic cylinder 16 and these hydraulic cylinders 16 have pistons slidable therein with piston rods fixed to the upset and by means of these cylinders and pistons the upset may be moved upward and downward. The upset is made in the form of an open frame with an outwardly extending peripheral flange 17 which is attached to the piston rods of cylinders 16 and when in the molding position it has a downwardly facing surface which rests on the upper surfaces 18 of the flasks.

The machine has two conveyors: The flask conveyor 19 and the pattern plate conveyor 20. The pattern plate conveyor is attached to the machine frame and extends outwardly therefrom and has the floor engaging legs 21 which form an integral part of the conveyor and rest on the floor or other supporting surface.

The pattern plate conveyor 20 has the spaced wheels 22 thereon and these wheels 22 are each received in one of the longitudinally outwardly facing channels 23 in the outer edges of the pattern carrier 28. Thus, the pattern plates can be shuttled from one end to the other of the track of the pattern plate conveyor 20. The pattern plate carrier is moved to the desired position along the track by means of the hydraulic cylinders 24. The hydraulic cylinders 24 have piston rods which are attached to the pattern plate carrier by means of a bracket 26. The cylinder 24 itself is affixed to the pattern plate conveyor 20 by means of brackets 27.

The pattern plate carriers 28 are in the form of open frames which are fixed together at adjacent edges. Into these openings are set pattern stools or plates 29. The pattern stools 29 have the patterns 30 fixed thereto in a conventional manner and the patterns 31 fixed also thereto in a conventional manner. The patterns 30 can represent the cope part of a pattern and the patterns 31 can represent the drag part of the patterns, or the two patterns, 30 and 31, could be two entirely different parts of two entirely different castings, in order to give the machine more versatility. Thus the pattern plate carriers could be first moved one at a time under the molding head 12 by means of the cylinder 24 and then the pattern plate carriers could be moved under the head one at a time. The machine could be indexed to perform any combination of the foregoing functions.

The pattern plate carriers 28 have the diverging inside surfaces 35 which meet with similar outwardly facing surfaces 34 on the pattern plates. Thus the pattern plates may be lifted from the pattern plate supports by means of the hydraulic cylinder lifting mechanism 36 or it can be lowered into the pattern plate supporting member as shown in FIG. 3.

Figure 1:
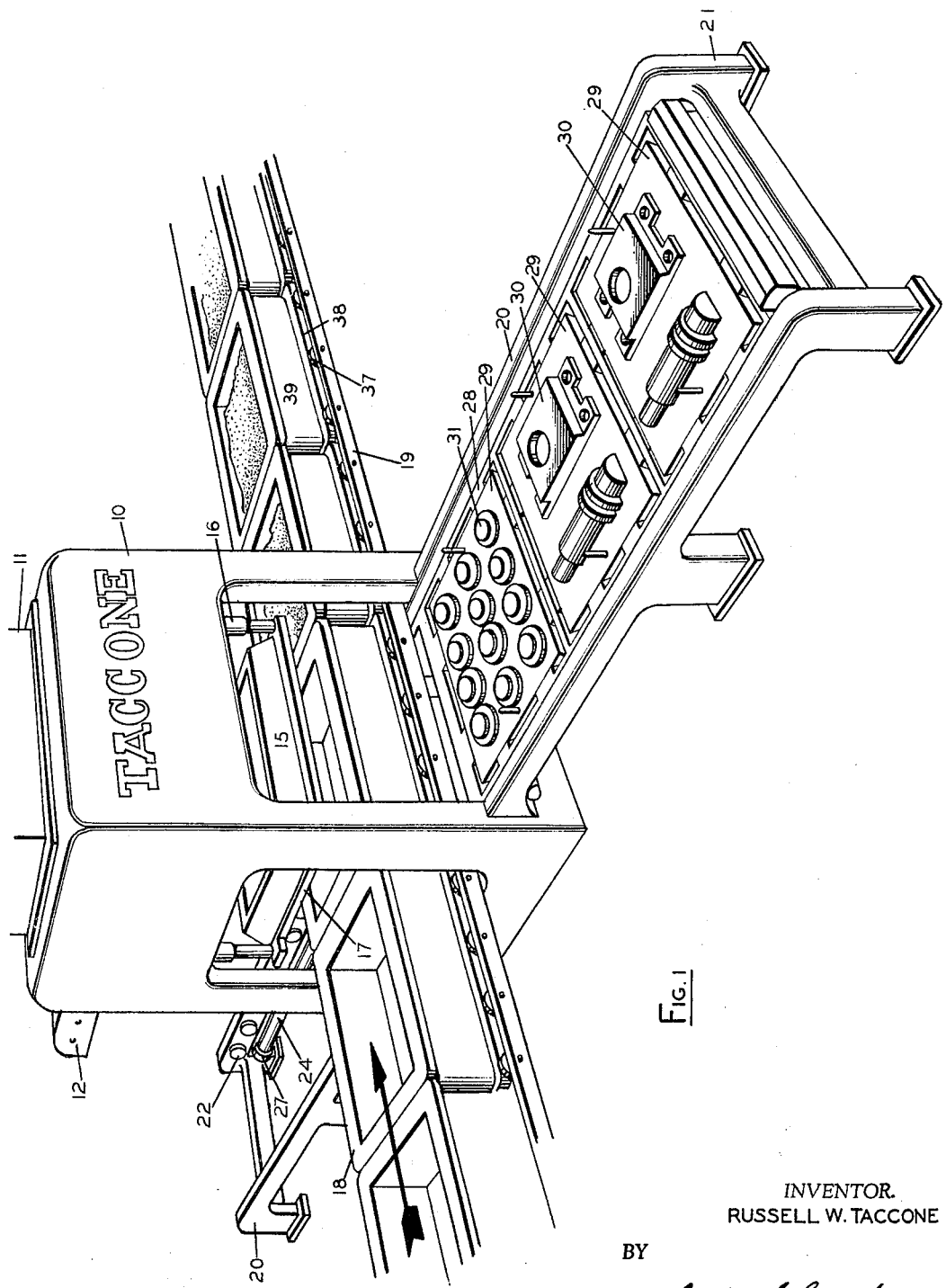
FIG. 1 is an isometric view of a molding machine according to one embodiment of the invention.

The flask conveying frame 19 is supported on the machine at an elevation above the pattern conveyor 20 and perpendicular thereto as shown in FIG. 1. The flask conveyor frame 19 has the spaced wheels 37 on its rails. These spaced wheels are similar to the wheels 22 on the pattern conveyor 20. These wheels 37 engage the lower flanges 38 of the flask 39, and convey them from a source of empty flasks at the left hand end of FIG. 1 to a pouring machine at the right hand end in a conventional conveyor system.

In operation, flasks from a source at the left hand end of FIG. 1 are rolled down the conveyor 19 by a suitable indexing device. They are each in turn brought to rest under the upset 15. The desired patterns 30 or 31 on pattern stools 29 are then brought to rest under the upset 15 and under the flask 39. Hydraulic cylinder 36 is then actuated to lift the particular stool 29 from the pattern carriers 28. This lifts the pattern plates 30 or 31 into engagement with the lower side of the flask 39 ready for filling with sand. Continued raising in turn lifts the flask to bring it into the relation shown in FIG. 2 with the compensating portion 41 of the molding head 12. The compensating portion 41 may have a diaphragm 42 thereon similar to that shown in machines of this type in the prior art. As the cylinder 36 continues to raise the flask, pattern, and pattern plate upward, the molding head continues to compress the sand 43 in the flasks until the proper density of the sand has been achieved. When the mold has been completed, the cylinder 36 can be retracted and the flask separated from the pattern when it engages the rollers 37 and the pattern plate again returns to its rest position in the pattern carriers 28. The cylinder 24 can then be indexed to move the next pattern 30 or 31 to the desired position under the flask for molding and the finished mold in the flask 39 can be indexed out toward the pouring station at the right hand side of FIG. 1, while the next empty flask in line will be brought into the molding position.

In FIG. 5, the machine is identical to that shown in FIGS. 1 through 4. However, in this embodiment, the machine frame is shown at 110 as having two pattern carriers 128 thereon which have patterns 130 and 131. In this embodiment the pattern plates 129, 131 are connected together and/or moved by the hydraulic cylinder 124' which is fixed to the frame 110 and has a piston rod 125' fixed to the bracket 126'. The patterns 130 are moved by hydraulic cylinder 124 which has the piston rod 125 fixed to the pattern plate carrier by means of the bracket 126. It will be seen that greater versatility of the machine can be accomplished with the embodiment of the invention shown in FIG. 5 than can be accomplished by means of that shown in FIGS. 1 to 4 because the two separate cylinders 124 and 124' move the pattern plates holding patterns 130 separately from those holding patterns 131. Therefore, with this embodiment of the invention it is possible to make any combination or sequence of molds.

In either of these embodiments, it is contemplated that the hydraulic cylinders 24, 124, and 124' could be substituted with air cylinders.

In the embodiment of the invention shown in FIG. 6 a machine is shown having two pattern plates 230 and 231 which are the cope and drag pattern of the same mold. This machine is especially suitable for use where a preparation of patterns between molding is necessary such as where chills or fillets or inserts must be set in the pattern plate between the time each mold is made.

The two pattern plates 231 and 230 are supported on a conveyor similar to that in the other machine indicated at 220. The cylinder 224 is fixed to the pattern plate frame at 227 and it has a piston rod 225 that is fixed to the pattern plate carrier by means of bracket 226. The pattern plates then may be moved under a molding head similar to that in the other machine by means of hydraulic cylinders and shuttled to the left and to the right as indicated by the arrow to perform the molding function. At the time the pattern 230 is under the head, the pattern 231 would be at the right, and at the time that pattern 231 is under the head, the pattern 230 will be at the left.

Figure 7:
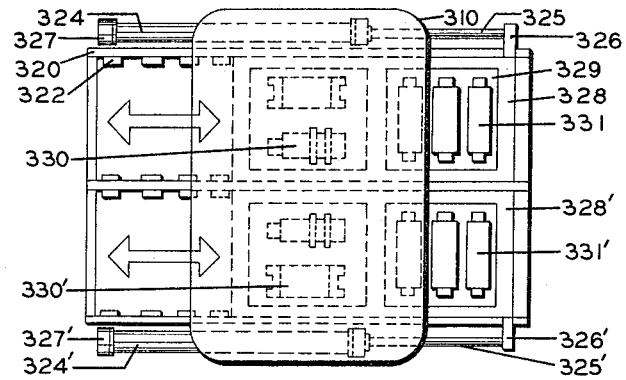
FIG. 7 is a schematic view of yet another embodiment of the invention.

The embodiment of the invention shown in FIG. 7 is identical to FIG. 6 except that it is a duplex machine wherein there are two pattern plates 330 and 331 and two pattern plates 330' and 331' as shown. Pattern carrier 328 is fixed to piston rod 325 by means of a bracket 326 and is actuated by the cylinder 324. Cylinder 324 is fixed to the frame 310 by means of the bracket 327. Cylinder 324' similarly moves pattern carrier 328'.

Figure 9:
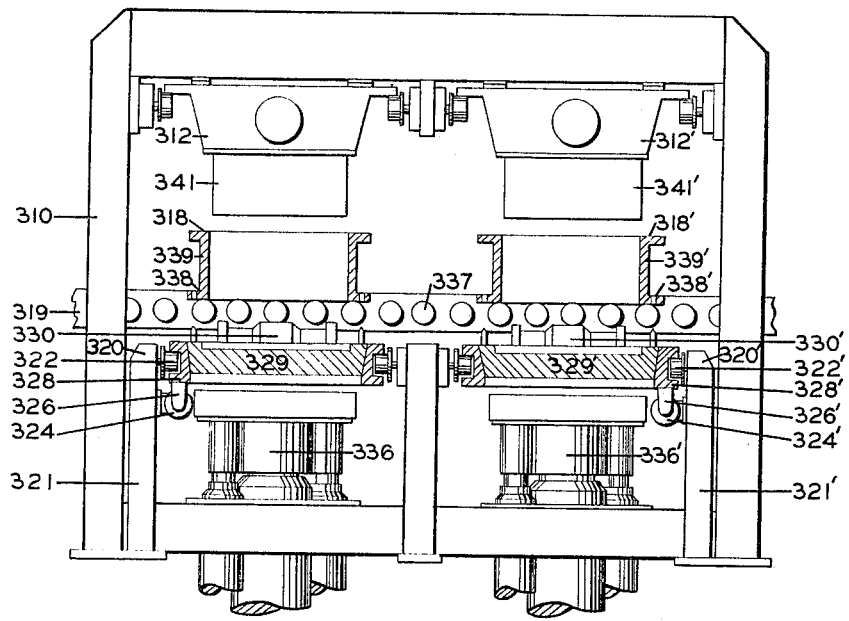
FIGS. 8 and 9 are views similar to FIGS. 2 and 3 respectively of another embodiment of the invention.
Figure 8:
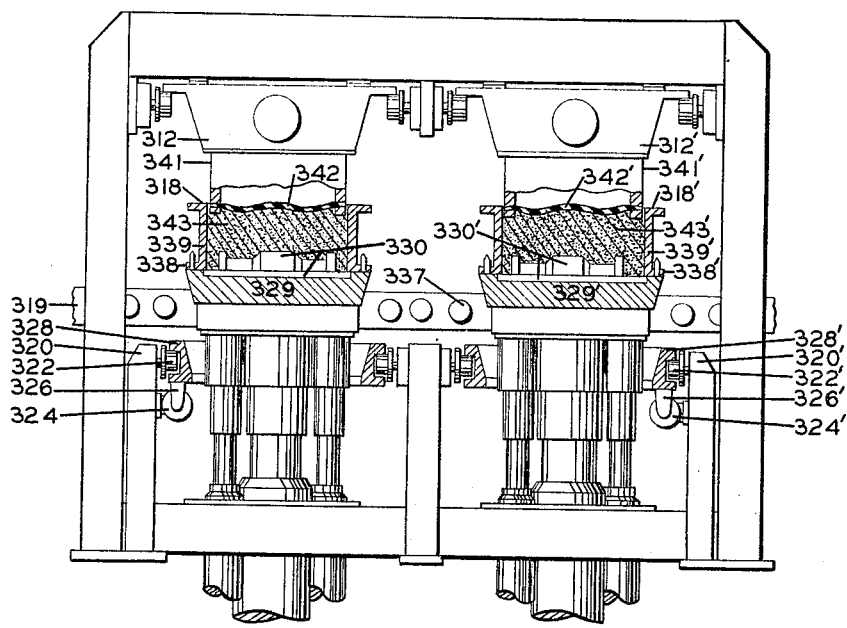

The embodiment shown in FIG. 8 has the molding heads 341 with lifting cylinder conveyors and other elements similar to that shown in the embodiment of FIG. 1 with all parts similar excepting that this is a duplex machine having double heads, that is, two independently operating heads and two independently operating rows of flasks as shown. The parts of these machines in FIGS. 7, 8, and 9 have numbers similar to those shown in the embodiment of FIG. 1, except that the number 300 has been added thereto. In this embodiment the cylinders 324 and 324' can be actuated independently to move the flasks effectively under the head in any combination desired.

In the embodiment of the invention shown in FIG. 10, the patterns 430, 431, 432, and 433 are all moved in unison by the cylinder 424, which is attached to the pattern plate frame by means of a bracket 426. Thus, the patterns can be moved selectively under the molding head 410 to mold them individually.

In the embodiment of the invention shown in FIG. 11, the patterns 530 and 531 are moved by the cylinder 524 while the patterns 532 and 533 are moved by the cylinder 524'. Thus, the patterns 530 and 531 may be used independently of the patterns 532 and 533. The patterns 529, 530 and 531 are arranged in pairs, each said pair of patterns being made up of two patterns arranged side by side. Thus, extreme flexibility is provided in the use of the machine.

In the embodiment of the invention shown in FIG. 12 a duplex machine is shown wherein the machine 610 is similar to that in the other embodiments of the invention insofar as the structure of the head is concerned. It has the pattern plate having the patterns 630 and 631, 630' and 631', which are moved by the cylinder 624 to bring the patterns 630 and 630' to the position shown under the head or to move it to the left and to bring patterns 631 and 631' under the head.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine having a frame,
    a pattern plate conveyor attached to said frame and extending on each side thereof,
    a flask conveyor supported on said machine above said pattern plate conveyor and disposed generally at right angles to said pattern plate conveyor and extending on both sides thereof and having means to support a pattern plate both on each side of said flask conveyor,
    a molding head on said machine supported above said flask conveyor and above said pattern plate conveyor,
    a pattern plate carrier on said pattern plate conveyor,
    at least two pattern plates on said pattern plate carrier,
    means to index flasks on said flask conveyor to selectively stop individual flasks below said molding head,
    means to move said pattern plates to bring them under said flasks at predetermined times,
    and means to lift said pattern plates into engagement with said flasks and then to lift said pattern plates and said flasks into engagement with said molding head whereby sand in said flasks will be compressed.

2. The machine recited in claim 1 wherein said machine has at least two pattern plate conveyors supported thereon side by side,
    each said conveyor having at least two said pattern plate carriers thereon,
    and separate means to move said pattern plate carriers whereby said patterns may be selectively moved under said head.

3. The machine recited in claim 1 wherein two additional pattern plate carriers are supported on said pattern plate conveyor, one laterally disposed from each said first mentioned two pattern plate carriers,
    one said second mentioned pattern plate carrier being adapted to be moved under said molding head along with one of said first mentioned pattern plate carriers each time said pattern plate carrier conveyor is moved.

4. The machine recited in claim 1 wherein said machine has two spaced pattern plate conveyors thereon,
    and separate means to move each said pattern plate conveyor independent of the other whereby said pattern plates on said pattern plate carriers can be selectively moved under said head.

5. The machine recited in claim 4 wherein each said pattern plate carrier has four said pattern plates thereon,
    said four pattern plates being disposed in pairs,
    said means to move said pattern carriers being adapted to selectively move pairs of said pattern plates under said molding head.

6. The machine recited in claim 1 wherein said pattern plate carrier has four said pattern plates disposed thereon in spaced end to end relation,
    and means on said machine to move said pattern carrier is adapted to move said pattern plates selectively under said head.

7. The machine recited in claim 6 wherein said pattern plate carrier has two rows of said pattern plates, each having four said pattern plates disposed in pairs thereon.

8. The machine recited in claim 1 wherein means is provided to move said molding head laterally from over said flask,
    and means to deposit sand in said flask while said head is removed from over said flask,
    and means to move said molding head back over said flask whereby said mold may be compressed in said flask.

9. The machine recited in claim 2 wherein two said pattern plate carriers are provided,
    said pattern plate carriers are separate from each other,
    and means to move said pattern plate carriers comprises two hydraulic cylinders, one attached to each said pattern plate carrier.

10. The machine recited in claim 1 wherein two rows of said pattern plates are supported on said pattern carrier side by side.

11. The machine recited in claim 10 wherein a separate hydraulic cylinder is connected to each said pattern plate carrier in each said row whereby said pattern plates may be selectively moved under said head.

12. The machine recited in claim 1 wherein said pattern plates are supported on a single pattern plate carrier,
    one pattern being a cope pattern and the other being a drag pattern,
    said machine being adapted to make alternate cope and drag molds.

13. The machine recited in claim 1 wherein said pattern plate carrier has two separate patterns thereon and means is provided to move said pattern plate carriers to selectively move any of said patterns under said head at any one time.

14. The machine recited in claim 13 wherein two separately actuated means are provided to move half of said pattern plate carriers individually to move either of said pattern plates under said head independent of the other said pattern.

15. The machine recited in claim 13 wherein said pattern plates have two rows of at least four patterns in each row,
    each said pattern in one said row being disposed beside a pattern in another said row whereby a plurality of pairs of patterns are provided,
    one of each said pair being in each said row,
    and means to move said pattern plates selectively to move any said pair of said patterns under said head at a predetermined time.

16. The machine recited in claim 13 wherein means is provided for moving said pattern plate carriers independent of each other,
    each said pattern plate carrier having at least four patterns thereon,
    said patterns being disposed in pairs,
    each pattern of a said pair being side by side,
    said pairs being disposed in tandem.

References Cited by the Examiner

UNITED STATES PATENTS

| | | | |
|---|---|---|---|
| 2,686,345 | 8/1954 | Young | 22—35 |
| 3,103,717 | 9/1963 | Taccone | 22—20 |
| 3,123,873 | 3/1964 | Taccone | 22—42 |

FOREIGN PATENTS 737,303  9/1955  Great Britain.

J. SPENCER OVERHOLSER, *Primary Examiner.*

MARCUS U. LYONS, *Examiner.*